Feb. 16, 1954 A. C. PETERSON 2,669,100
APPARATUS FOR HEATING AND COOLING AIR
Filed April 19, 1951 4 Sheets-Sheet 4
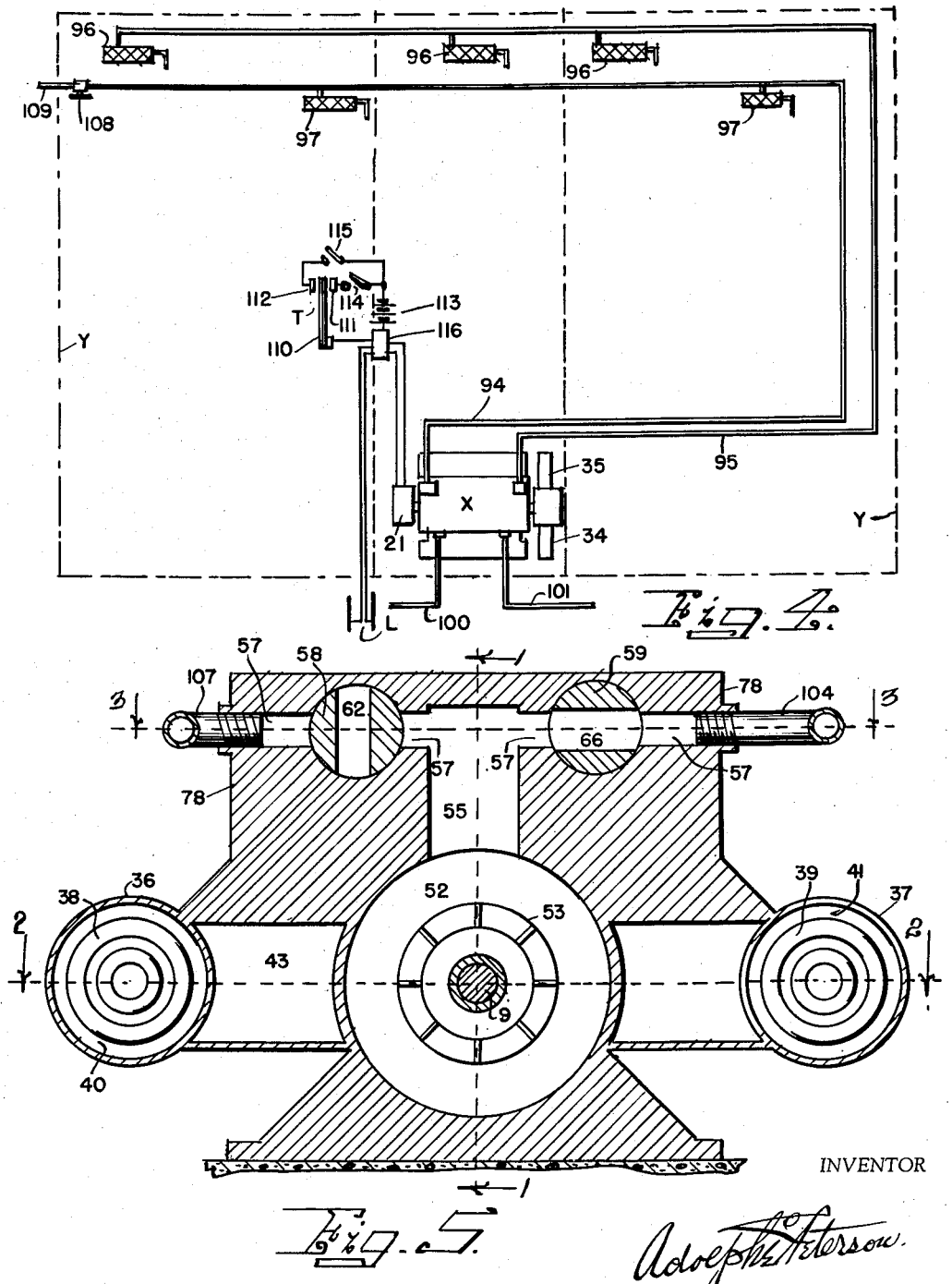
INVENTOR
Adolph C. Peterson Patented Feb. 16, 1954

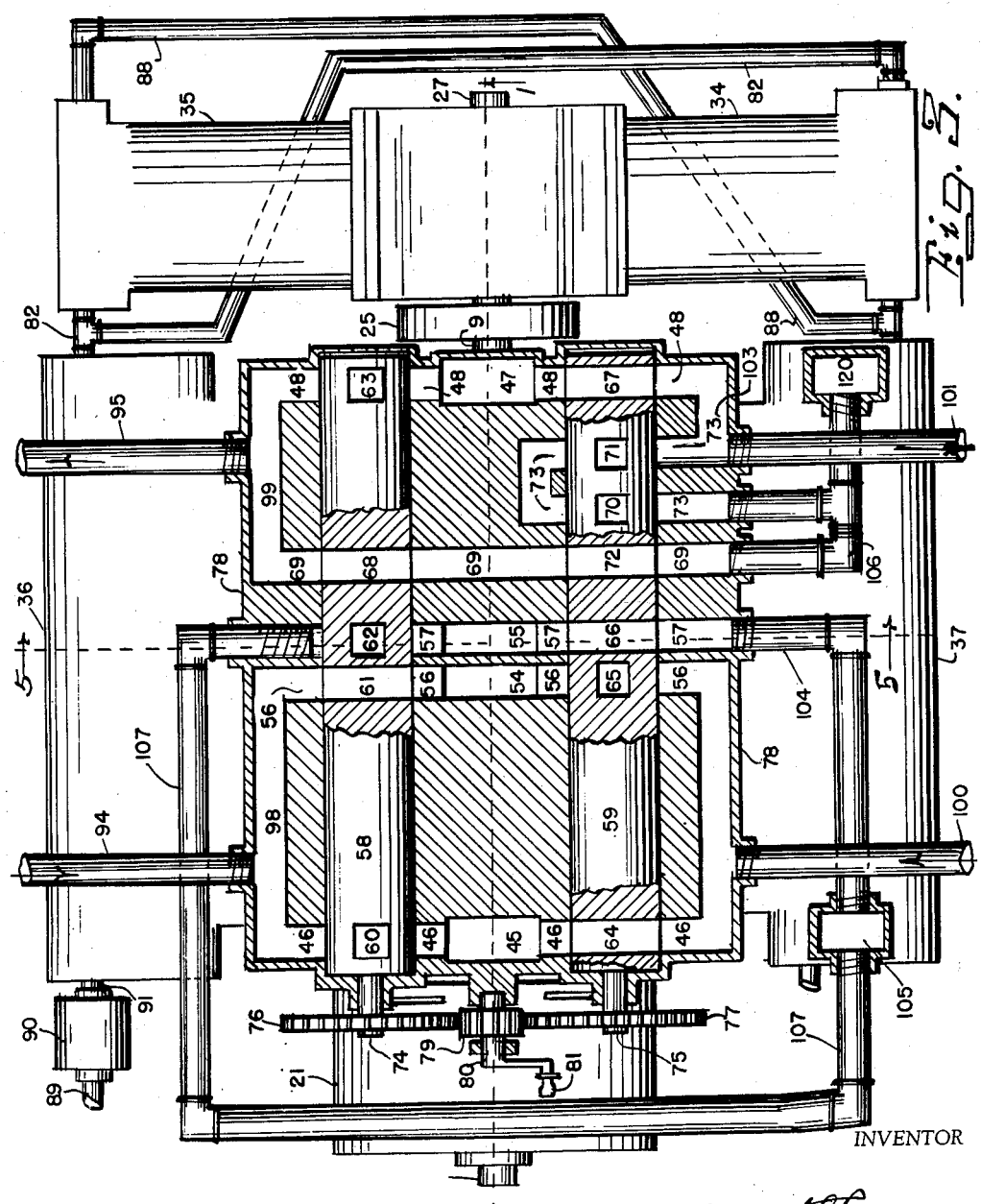

2,669,100

UNITED STATES PATENT OFFICE 2,669,100

APPARATUS FOR HEATING AND COOLING AIR

Adolphe C. Peterson, Minneapolis, Minn.

Application April 19, 1951, Serial No. 221,799

9 Claims. (Cl. 62—136)

My invention relates to a means and a method for the heating and cooling of building interiors, especially of homes, and is called apparatus and method for heating and cooling.

The principal objects of my invention are to provide an apparatus for heating and cooling, which means and method shall be of that type, generally speaking, which extracts heat from atmospheric air for interior heating and which extracts heat from interior air for cooling, and to provide such a means and method in a simple form and method, which shall require the minimum of machinery and material, and the minimum, or near a minimum of complication in its apparatus, for accomplishment of its primary object, extraction of heat and transfer of the heat. A chief object is to provide a means and method for use of atmospheric air for provision of heat for heating even in rather cold climates such as the Northern States, as well as the Southern States of the United States, without the need for particularly high compression of that atmospheric air for accomplishment of the heat extraction, and to provide as a complement function, with the same apparatus, particularly effective cooling in the hot periods of the year or season. An object is the provision of such a means, utilizing a combination of air heat extraction and cyclic use of a refrigerant, for the heat transfer, in a means which is readily converted from the use for heat provision, to the use for cooling in the summer season, and in a means which utilizes all of the means or material of the means for accomplishment of both functions, in order that thereby the minimum of apparatus and material and cubic space occupied, is needed for the apparatus. The particular object is to provide an apparatus, which will utilize a means providing comparatively low compression of atmospheric air for heat transfer in a minimum of space and with a minimum of air use, in order especially to provide efficiency in use of the power current supplied to the means, and utilizing in combination therewith cyclic expansion and compression of a refrigerant for extraction of heat from the compressed air. A particular object is also the provision of specific coordinating means by which the apparatus may be conveniently and correctly utilized for either of its dual functions, with efficiency. In general the object is improvement of device or apparatus and method for a system functioning as either heating or cooling means with use of atmospheric air as a medium providing heat for heating or extracting heat for cooling.

The principal devices and combinations of devices comprising my invention are as hereinafter described and as defined in the claims. In the accompanying drawings which illustrate my invention, like characters refer to like parts throughout the several views.

Referring to the drawings:

Figure 3 is a view in horizontal section on a plane passing through the lines 3—3 of Figures 1 and 5, this section being a horizontal section through the axes of the pair of valves which control the flow of the air streams in the device, other parts of the device being shown partially in plan view below that level, and some parts being broken away.

Figure 4 is a diagrammatic view showing the installation of a device as described, in a building such as a house, and showing its relation to or association with registers and thermostatic means.

Figure 5 is a vertical section at right angles to the section of Figure 1, on the line 5—5 of Figures 1, 2, 3.

Figure 1:
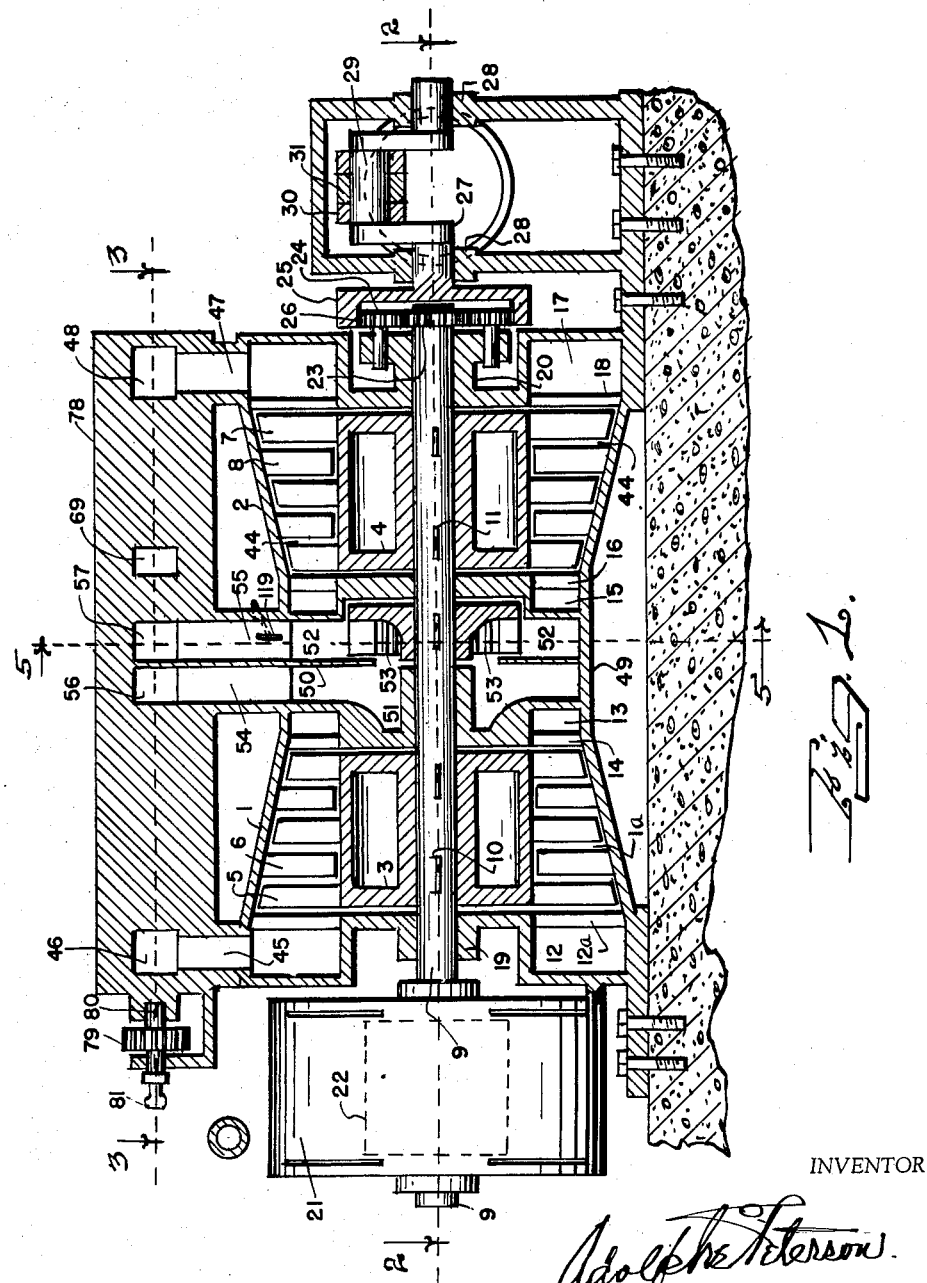
Figure 1 is a view in vertical section on a plane passing vertically through the axes of the principal operating elements of my device, this section being on the lines 1—1 of Figures 2, 3, and 5, some parts being shown in full side elevation.
Figure 2:
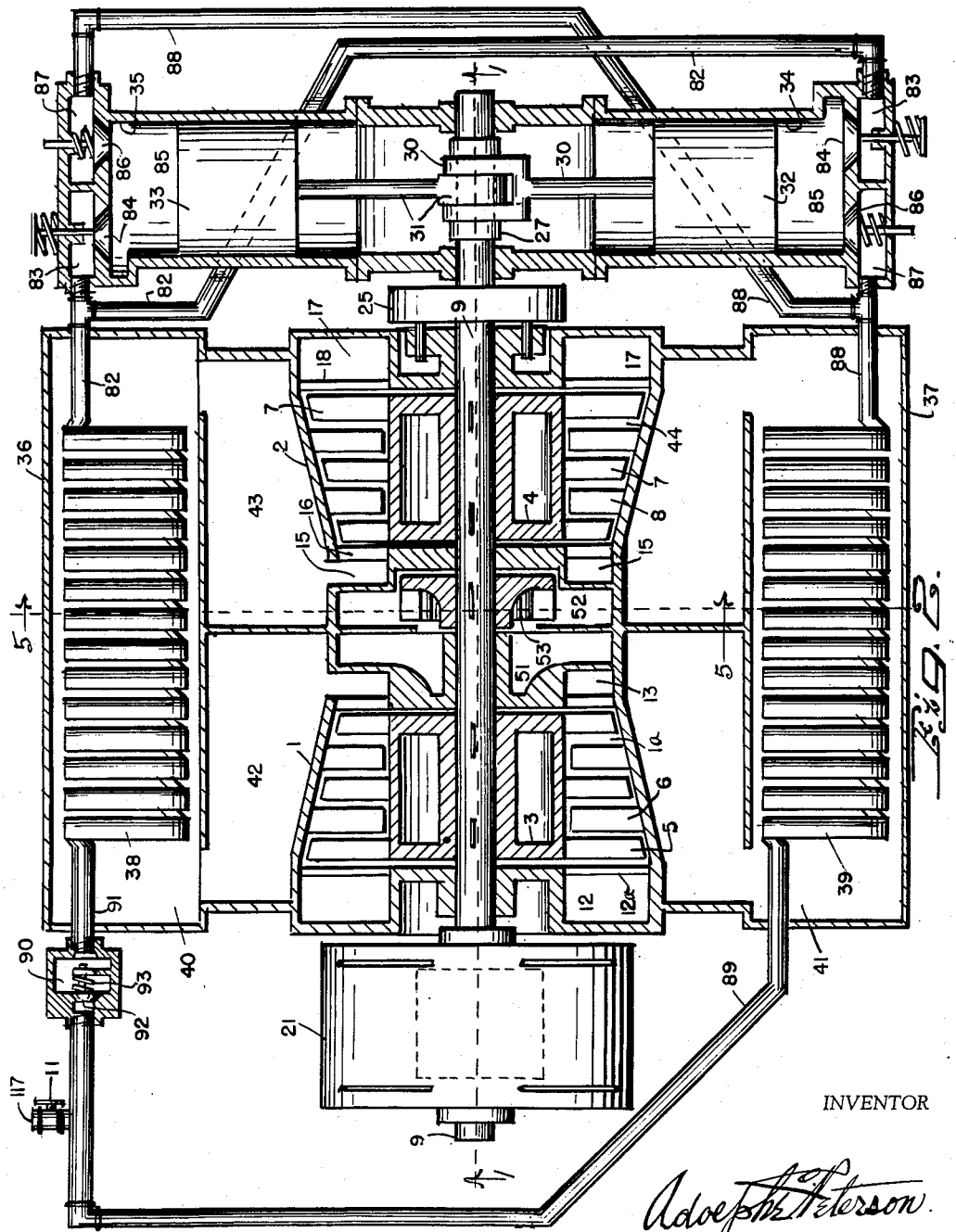
Figure 2 is a view in horizontal section on a plane passing through the lines 2—2 of Figures 1 and 5, this section being a horizontal section through the axes of the chief operating or rotating elements of the device and on the level of those axes, some parts being shown in full plan view and some parts being broken away.

Referring to the drawings, the numeral 1 designates a compressor casing, 2 a turbine or expansion casing, 3 a compressor rotor, 4 a turbine rotor, 5 compressor rotor blades, 6 compressor stator blades, 7 turbine rotor blades, 8 turbine stator blades, 9 the shaft on which the compressor rotor 3 and turbine rotor 4 are mounted to rotate therewith and fixed to the shaft by key means 10 and 11, 12 the compressor air intake annular in form with guide blades 12a, 13 the compressor air discharge annular in form with guide blades 14, 15 the turbine air intake annular in form with guide blades 16 forming nozzle means for direction of air, 17 the turbine air discharge annular in form with guide blades 18; 19 and 20, the bearings in which the shaft 9 rotates, 21 an electric motor which by its armature 22 drives the shaft 9 and thereby compressor rotor 3 and turbine rotor 4. The end of shaft 9 opposite to the end on which electric motor 21 drives it, externally of the turbine casing, has a small spur gear 23 fixed on it, and this by small spur gears 24 drives a drum 25 by its internal spur gear 26, at a speed which may be say one fifth to one tenth of the speed of shaft 9, depending on the particular construction and proportions. The drum 25 is fixed on the near end of a crank shaft 27, which is mounted in bearings 28, has a crank pin 29 on which are flexibly mounted a pair of rod wrist ends 30 and 31 which numerals also designate connecting rods associated with the wrist ends. The conducting rods 30 and 31 are flexibly connected in pistons 32, 33, to reciprocate those pistons in compressor cylinders 34, 35, these being located on opposite sides of the crank shaft 27.

A pair of heat transfer units 36, 37, respectively, are located on opposite sides of the compressor and turbine casings, in approximately the same horizontal level, and in each of these there is a heat transfer coil, the transfer coil 38 in one unit being an expansion coil for evaporative expansion of a refrigerant therein with heat absorption from air externally in unit 36, the transfer coil 39 in the other unit 37 being a compression conduit for reception of fluid under compression and increased temperature from the refrigerant compressor as hereinafter described, the heat of the refrigerant fluid in the condenser conduit 39 (heat transfer coil) being transferred to air externally of the coil 39. Air space in heat transfer unit 36 is denoted 40 and air space in heat transfer unit 37 is denoted 41.

The compressor air discharge chamber 13 always discharges air as compressed by way of air conduit 42 to the one end of the air space 40 in the heat transfer unit 36 and the air space 40 at its opposite end discharges air passing from space 40 to the air conduit 43 which discharges air to the intake chamber 15 of the entially of blower 53, and thereby to the vertical operation of the device, as hereinafter explained, the air compressed by compressor rotor 3 passes through the air space 40 of the heat transfer unit 36 and gives up heat to refrigerant fluid internally of expansion coil 38 and after giving up heat thereto, the air passes by way of air conduit 43 to the inlet chamber 15 of the turbine casing 2, and as guided by blades 16, passes through the expansion or turbine air course denoted 44 in turbine casing 2, to expend heat energy in driving turbine rotor 4 by means of its blades 7, the air then passing to turbine discharge chamber 17.

The compressor intake chamber 12 receives air for compression from the vertical conduit 45 which in turn receives air from transverse conduit 46. The turbine discharge chamber 17 discharges air through vertical conduit 47 to the transverse conduit 48.

There is formed between the compressor casing 1 and the turbine casing 2, an intermediate casing 49 joined with the casings 1 and 2 for support only, but not having communication with the interiors thereof; and in the intermediate casing 49 there are formed two annular chambers axially co-incidental, but spaced side by side and divided by annular wall 50, one 51 forming a blower intake chamber and the other 52 forming a blower chamber wherein a blower 53 of rotary or centrifugal type and fixed on shaft 9 to be driven thereby, rotates. The blower 53 is not a compressor but is merely a means for displacing or moving air from the vertical conduit 54 to blower intake chamber 51 and thereby to the air blower 53 and thereby to the portion of chamber 52 externally of and circumferentially of blower 53, and thereby to the vertical conduit 55. The vertical conduit 54 receives air from transverse conduit 56, and the chamber 52 delivers air to the vertical conduit 55 and thereby to the transverse conduit 57. The blower 53 need be of a diameter only such that it will cause the movement of the air from the transverse conduit 56, as hereinafter described and into transverse conduit 57 and thereby into conduits designated.

The transverse conduits 46, 56, 57, 48, are all located in the horizontal plane of section as shown in Figure 3 and they are thus all on the same level and all are transversely of the unit or means. The transverse conduits have each two portions as shown the two portions of each extending in opposite direction from the upper ends of the conduits with which they connect, namely vertical conduits 45, 54, 55, 47, and the portions extending one way are bi-sected by a cylindrical valve 58, and the portions extending the other way are bi-sected by the cylindrical valve 59. The cylindrical valves 58, 59, are each approximately as long as the axial length combined, of casings 1, 49, 2, and they are rather large in diameter so they may adequately form passage ports. The cylindrical valve 58, has the four passage ports 60, 61, 62, 63, in the transverse vertical planes, respectively, wherein are vertical conduits 45, 54, 55, 47 and their respective associated transverse conduits 46, 56, 57, 48. The cylindrical valve 59 has the four passage ports 64, 65, 66, 67, in the transverse vertical planes, respectively, wherein are vertical conduits 45, 54, 55, 47 and their respective associated transverse conduits 46, 56, 57, 48. The cylindrical valve 58 has one other passage port 68 adapted to be aligned with and permit passage through transverse conduit 69. The cylindrical valve 59 has two other passage ports 70, 71, 72 adapted to be aligned with and permit passage, alternatively, through transverse conduits 69, and 73.

The two cylindrical valves 58 and 59 have, shafts 74, 75, respectively, fixed thereto axially, at one end, and the shafts have large spur gears 76, 77, respectively fixed thereto outside of the valve casings formed in valve mounting or casing 78. The large spur gears 76, 77, are in permanent cooperation with a smaller spur gear 79 mounted on shaft 80 of hand crank 81. By means of hand crank 81 and spur gear 79, the large spur gears 76, 77 and valves 58, 59, may be turned in unison to place the valves 58, 59 in their alternative positions, such that, in the one alternative status, some of the passage ports are in alignment with their associated transverse conduits, as to each valve, and so that in the alternative status, others of the passage ports of the two valves 58, 59, are in the alignment positions, and the first named passage ports, are not in the alignment positions, and vice versa. The valves 58, 59, will when set in either status, retain that position. It may be noted that any means may be provided for ensuring retention in the set positions.

The transfer coil 38 by conduit 82 discharges refrigerant fluid to valve chambers 83 in compressor cylinders 34, 35 and, when valves 84 are open, to compressor spaces 85, in cylinders 34, 35. The last named spaces discharge, when discharge valves 86, are open, to valve chambers 87 in cylinders 34, 35, and by these valve chambers, to the conduit 88, and thereby to the condenser conduit 39. The condenser conduct 39 discharges refrigerant fluid by way of conduit 89 and expansion valve chamber 90 to the conduit 91 and thereby to the receiving end of expansion coil 38. The expansion valve chamber 90 has a valve 92 interposed in the passage to chamber 90, the valve 92 being under pressure of the compression spring 93, so that refrigerant fluid is maintained under constant compression in the condenser conduit 39.

The device, as above described, may be placed in a house basement or at any location in a house, and as illustrated in Figure 4, where the device as above described is generally designated, as X, is in much reduced scale, the unit X is connected with house air conduits 94, 95, the one 94 being a house discharge or return conduit, and the one 95, being a house delivery or flow conduit, to pass air to air discharge registers 96 located at various locations in the house interior. The house plan is designated by diagram Y. The return conduit 94 passes air from the house interior space as received by return registers 97, to a common conduit 98 which passes air to either transverse conduit 46 or 56, as hereafter described. The air conduit 95 is connected with common conduit 99 which connects with transverse conduits 69 and 48, in the manner as hereafter described.

Two conduits 100 and 101, respectively, are atmospheric air intake conduit and atmospheric air discharge conduits, respectively, one receiving air from outside atmospheric air, its intake end being located exteriorly of the house, the other discharging air to the outside atmosphere, its discharge end being located exteriorly of the house or building, preferably somewhat remotely from the intake end of the conduit 100, so that air from one will not tend to be mixed with air entering the other. Conduit 100 delivers atmospheric air to common conduit 102 which in turn delivers to either transverse conduits 46, or 56, as hereafter described. The conduit 101 discharges air from common conduit 103, which in turn discharges from alternative conduits 48 or 73, as hereafter described.

The transverse conduit 57, as permitted by the valves 58, 59, may discharge air to conduit 104 and thereby to vertical conduit 105 in the transfer unit 37, discharging air to the associated end of space 41. The alternative conduits 69 and 73, as hereafter described by the valves, as hereafter described, may alternatively receive air from space 41, by conduit 106. The transverse conduit 57, as permitted by the valves 58, 59, may, in the alternative position of the valves, discharge air received from blower 53 to conduit 107 and thereby to vertical conduit 105 in transfer unit 37 this conduit 105 discharging the air to the associated end of space 41. The conduit 94 which receives air from the house interior, may receive some portion of its air, passing to unit X, from outside atmosphere, by way of the exteriorly exposed end 109 of conduit 94, the hand valve 108 being normally closed in the heating season, but subject to opening manually, when desired, to admit some portion of fresh air, to circulate with the house air for replenishing the supply of fresh air, in the house.

There is placed within the house interior space, a thermostat T, which has thermostatic element 110, and contacts 111, 112, one to close the circuit through battery 113 when the minimum desired temperature is reached in the winter season, when hand switch 114 is closed, and the other to close the thermostatic circuit in the summer season, when the maximum desired temperature is exceeded, when hand switch 115 is closed. The battery circuit through battery 113, when closed will by any means as commonly used in relay means 116, close a circuit from the main electric current lines L, to thereby send current from those main lines to the electric motor 21, for operation of that motor and thereby shaft 9 and with it the rotors 3 and 4, and crank shaft 27. The thermostatic means T and the relay means 116, are only diagrammatically shown, but may be of any type of such means, as commonly known and used, and may have any type of adjustment of the thermostatic elements and the association of the contacts therewith, so that adjustment of the maximum and the minimum temperatures, in the house rooms, may be enabled.

The conduit 89, or any part of the refrigerant fluid circuit, may be provided with a branch conduit 117, normally closed by hand valve 118, or any other type of valve means, whereby the operator may, in initial operation, or when necessary, introduce a refrigerant fluid, such as Freon, or any type thereof, or any other type of refrigerant, such as ammonia, into the conduit 89, and thereby into the circuit composed of the evaporative coil 38 and the compression coil 39 for use as the refrigerant, circulating in those coils, and in the compressor cylinders 34—35. The refrigerant fluid in the evaporative conduit 38 and condenser conduit 39 may be called the heat carrier fluid.

It is contemplated that the device may be used in either the winter season or the summer season and especially in moderate climates such as the North and South Temperate Zones. For use in winter for heating a house interior, or any enclosed space, such as a railroad car or coach, or a freight car for perishables, such as fruit or vegetables, the device is set by its controls for either one or the other operation. For the function desired, the operator closes either hand switch 114 or hand switch 115, leaving the other open, and at the same time he turns the hand crank 81 to turn the valves 58, 59, simultaneously to either the winter heating positions, or the alternative summer cooling positions. The valves 58, 59, as shown in the drawings Figures 3 and 5, are in the positions for winter heating of the associated house interior, that is in this position, the valves are set for the abstraction of heat from the atmospheric air inspirated and expelled continuously by the device for the heating of the evaporative coil 38 and thereby through the refrigerant fluid for the heating of the house air by the compression coil 39. In the alternative positions of the valves 58—59, the valves are set for abstraction of heat from the house interior air as circulated through the unit X by conduits 94, 95, that is for circulation of house air through the circuit consisting of the compressor casing 1 and the air space in heat transfer unit 36 and the turbine casing 2, so that heat is abstracted from the compressed house air by the heat abstracting effect from evaporation of refrigerant fluid in the evaporative coil 38, the heat abstracted being in this case abstracted from the refrigerant fluid when the refrigerant fluid passes through the compression coil 39, where heat flows from the refrigerant fluid into the atmospheric air circulated through space 41 from and back to the exterior atmospheric air. It is contemplated that valves 58, 59, will have a relatively close fit in their valve casings, so their positions will be permanently maintained, when set for either season, but any type of locking means may be used for ensuring that fixed status.

The use and operation of the device for the winter operation is now described. It should be noted that any indicating or marking means may be used on the faces of gears 76, 77, or any other means may be used to indicate to the operator when the valves are properly set, as he desires.

Assuming that current is supplied by main lines L, that hand switch 114, the hand switch for winter use, is closed (the other being open), and that the valves 58, 59 are set as shown in the drawings, Figures 3 and 5, for winter operation, the thermostatic means T will then, whenever the temperature in the house interior is below the minimum predetermined temperature, which may be say 72 degrees Fahrenheit, or thereabouts, cause the relay means 116 to send electric current through the electric motor 21, and thereby shaft 9 and rotors 3 and 4, are rotated at a very high speed, which may be say any speed from five to fifteen thousand revolutions per minute, or even more, and the crank shaft 27 operating the compressor pistons 32, 33, will operate at a lesser speed which may be say 1000 revolutions per minute to 3000 revolutions per minute, or more or less than that number, as may be proper in any construction. The speeds of the means in any construction will be determined by the individual construction, its proportions, its material strength, and other considerations, but the speed of shaft 9 will preferably be say five to ten thousand revolutions per minute. The construction of the electric motor 21 and its armature 22, and their relation to the current from main lines L will be sufficient in most constructions and uses, to determine the speed and place an upward limit on that speed, but it may be noted that, in any construction, as may be needed, any type of governing means may be used with the motor 21 and its current supply, to limit the maximum speed of the shaft 9 and crank shaft 27, associated therewith.

Under this condition of operation, there will be two streams of air through the unit X, and there will also be the stream or circuit of refrigerant fluid; one stream of air being moved by compressor rotor 3 through space 40 and then from space 40 to the inlet chamber of turbine rotor 4, and simultaneously another air stream which will be moved by the blower 53. The compressor rotor 3, will be constructed to operate to compress air to the pressure of at least thirty pounds or thereabouts, or even more, if that be desired, say to 90 or one hundred pounds, while the blower 53 will have such size or diameter and such association with the passages through which its delivered air flows, that the pressure of the air circulated thereby, will not exceed, say one to five pounds, preferably no more than one or two pounds, and in any case, not more than that pressure, above atmospheric pressure, which is needed to circulate the air through the blower 53 and its associated passages or space, for the operation selected. This pressure may thus be no more than a pressure of a few ounces above atmospheric pressure, that is such a pressure as will cause movement at a rapid speed of the air stream passing or moved by the blower 53. This pressure should be and is low so that it will not cause heating, but merely displacement or moving of the air stream. On the other hand the air stream entering compressor casing 1 and compressed by compressor rotor 3, is passed through a sufficient number of stages of the compressor blades 5 and 6, so that adequate compression of the air is attained to secure raising of the temperature of the air as compressed by rotor 3, to a temperature of at least fifty to one hundred degrees Fahrenheit, above the temperature at which air enters intake chamber 12, and passes from chamber 13 to space 40, and that temperature in some constructions, if that be desired, may even be as much as three hundred to four hundred degrees Fahrenheit; the compression pressure, attained by the construction and speed of compressor rotor 3, being accordingly such as to attain that desired temperature. It may be noted that the passages through the nozzles formed by the guide blades 16 should be of such small size or capicity for passage of air, and the turbine course 44 should also be of such size or capacity for flow of air, that the compression pressure desired, say thirty or more pounds, at least, or even one hundred pounds, will be quickly reached and be maintained in the space 40 and conduit 43; and intake chamber 15 of the turbine rotor 4. The air stream passing into intake chamber 12, may have a speed of movement, of as much as one thousand feet, more or less, per second of time, that depending on the construction, so that a large volume of air will be passed through compressor course of compressor casing 1 and through turbine course 44 of turbine casing 2 and likewise through space 40, and any means such as a hand valve may be used for variation of that flow if desired.

The air stream moved by blower 53 should on the other hand be relatively slow, while still quite rapid. This flow of the air stream, so-called secondary air stream by blower 53, may be varied somewhat by a hand valve 119 placed in vertical conduit 55. Thus this conduit 55 may be partially closed for winter heating operation, and may be wide open for the summer operation or cooling operation.

The air stream moved by compressor rotor 3 through space 40 to inlet chamber 15 and the air expansion course 44 of turbine casing 2 is a primary air stream, and the course through which it flows is generally designated a primary air course. This primary air course includes the annular space 1a of casing 1 which space is a compressing space and it includes space 40 a compressed air course, and annular chamber 17 which is a primary air discharge conduit. The secondary air course includes the air blowing channel where the air blower which is an air displacement means 53 operates, the secondary air intake 51—54, the secondary air discharge 52—55. A so-called heat carrier fluid course includes; the evaporative conduit 38 which is a heat absorption conduit; the compressor cylinder bores 85 with their intake chambers 83 and discharge chambers 87 which constitute a carrier fluid compressing course; the condenser conduit 39 which is a heat transfer conduit. The one conductive means includes the conduit 100, an atmospheric air inspirating means; the conduit 101 which is an atmospheric air aspirating means. The other conductive means includes the return conduit 94 and return registers 97 which are generally internal intake means; the house delivery or flow conduit 95 and air discharge registers 96 which are generally internal discharge means.

In the winter operation, as is now described, the circulation of the primary air stream, so-called, is as follows: atmospheric air enters the conduit 100 from its end exposed outside the building wall, and that air from atmosphere moves in a continuous stream through conduit 102, 46, vertical conduit 45, intake chamber 12, compressor course 1a, discharge chamber 13, conduit 42, space 40, where heat of compression is given up to evaporative coil 38, from space 40 to conduit 43, turbine intake chamber 15, turbine course 44, discharge chamber 17, vertical conduit 47, transverse conduit 48, passage port 67 of valve 59, the succeeding portion of transverse conduit 48, conduit 103, and by way of conduit 101 to atmosphere outside of the building wall and is there discharged by way of the open end of conduit 101. In that course through the unit X, the atmospheric air has been compressed in compressor course 1a, given up heat to coil 38 in heat transfer unit 36, passed to turbine course 44 wherein the air, which has entered turbine intake chamber 15 at approximately the pressure at which it passed from compressor course 1a but slightly less, has been expanded and its velocity increased so that the air passing through course 44 has expended further heat and energy in driving the turbine rotor 4 by its blades 7, and then has passed again to atmosphere by way of conduit 101 at a considerably less temperature than the temperature at which it was received from the atmosphere, since heat has been given up.

In the same space of time or coincidentally the crank shaft 27 has been driven at its proportionate speed and compressor pistons 32, 33, have been reciprocated and have withdrawn the refrigerant fluid from evaporative coil 38 as withdrawn through expansion means 90—92 from conduit 89, and has compressed that fluid in compressor cylinder spaces 85 and passed the refrigerant fluid to conduit 88 as highly compressed fluid thereby raising the temperature of the fluid, and has passed that high temperature refrigerant fluid to condenser conduit 39, where the heat of the refrigerant fluid has been transferred through the walls of condenser conduit 39 to the secondary air stream passing through space 41, and has forced that fluid under compression to the expansion means 90—92, for recirculation.

In the same space of time or coincidentally, the blower 53 has withdrawn a continuous stream of house air, the secondary air stream, from the building interior space, and has passed that air stream through registers 97, conduit 94, conduit 98, transverse conduit 56, passage port 61 of valve 58, vertical conduit 54, intake chamber 51, to blower 53, annular chamber 52, vertical conduit 55, transverse conduit 57, passage port 66 of valve 59, conduit 104, vertical conduit 105, space 41 of unit 37, where heat is transferred to it from compression coil 39, by way of vertical conduit 120 of transfer unit 37 to conduit 106, transverse conduit 69, passage port 72 of valve 59, passage port 68 of valve 58, conduit 99, conduit 95, to registers 96, where the heated secondary air stream is dispersed to the interior air of the house interior space for heating therein.

It will be noted that in this condition of operation, the passage ports of valves 58, 59 bar any other passage of the air streams since they are turned so as not to be aligned with their associated transverse conduits for the passage.

For the summer operation, for cooling of the building interior, the circulation of air streams is as follows: The primary air stream, that passing through the compressor course and turbine course 44 is now differently associated, since the valves 58—59 have been turned by the hand crank 81 and gears 79, 76, 77, so that the passage ports are in the alternative positions, and in these alternative positions, air is withdrawn from the interior space of the building interior by registers 97, conduit 94, conduit 98, transverse conduit 46, vertical conduit 45, intake chamber 12, compressor course 1a (where the air is compressed), and the air as compressed, is passed, by discharge chamber 13, conduit 42, space 40 (where heat is given up to evaporative coil 38), conduit 43, turbine intake chamber 15, turbine course 44, discharge chamber 17, vertical conduit 47, transverse conduit 48, passage port 63 of valve 58, conduit 99, conduit 95, and to registers 96, where the cooled air is discharged for intermingling with the house air.

In the same space of time, or coincidentally, the secondary air stream (that displaced by blower 53, is drawn from the outside atmosphere by way of conduit 100, conduit 102, transverse conduit 56, vertical conduit 54, blower chamber 51, blower 53, blower chamber 52, and is passed, by way of vertical conduit 55, transverse conduit 57, passage port 62, conduit 107, vertical conduit 105, space 41 of transfer unit 37 (abstracting heat from condenser conduit 39), vertical conduit 120, conduit 106, conduit 73, passage ports 70—71 of valve 59, to conduit 101, and by way of the open end of conduit 101, outside of the building, to the atmosphere outside of the building, the air being somewhat heated in that course to atmosphere.

In the same space of time, or coincidentally, the compressor pistons 32, 33, have withdrawn refrigerant fluid from evaporative conduit 38, absorbing heat in that process from air in space 40, and have compressed that refrigerant fluid, and passed it as compressed fluid, at a higher temperature to condenser conduit 39, where heat has been given up to the atmospheric air being blown through the space 41 by blower 53.

In the use for heating, in winter, the primary air stream, which is then the outside atmospheric air has been compressed to what may be a pressure sufficient to raise temperature to an efficient working temperature and pressure, and has given up heat to the evaporative conduit 38, and has been again passed to outside atmosphere, and coincidentally the compressor pistons 32, 33, have evaporated refrigerant fluid in conduit 38, withdrawing heat from the compressed atmospheric air, and have compressed the refrigerant fluid, to cause that fluid to give up heat to the air stream passing from the building interior space through space 41 of transfer unit 37, and coincidentally, the house air has been blown by blower 53, at just sufficient pressure to cause that movement, from the house interior, through the space 41 to take up heat from the heat of the compressed refrigerant fluid in condenser conduit 39, and that house air thus heated, has been blown back to the house interior space for heating.

For the summer cooling, the primary air stream, which is then the interior house air has been compressed by the compressor rotor 3 to that is a pressure sufficient to raise temperature so that heat may be given up to the evaporative conduit 38, and that house air after that abstraction of heat has been expanded through turbine course performing work on the turbine rotor 4 by the expansion to atmospheric pressure therein, and after this expansion and cooling thereby, the house air has been again passed back to the house interior space, and coincidentally the compressor pistons 32, 33, have evaporated refrigerant fluid in conduit 38, withdrawing heat from the compressed interior house air, and have then compressed the refrigerant fluid, to cause that fluid to give up heat to the air stream then passing from the external atmospheric air to blower 53, at just sufficient pressure to cause that movement, from the atmospheric outside air, through the space 41 to take up heat from the heat of the compressed refrigerant fluid in condenser conduit 39, and that atmospheric air thus heated, has been blown back to the exterior atmospheric air, carrying the withdrawn heat with it thereto.

In the operation of the device, in either status, for the winter heating, or for the summer cooling, the air of the primary air stream (atmospheric air in winter and house air in the summer) is first compressed, the heat is abstracted, then that air still under approximately the same high compression, is passed through the nozzles between the guide blades 16 of the turbine, being restrained thereby to maintain the compression until these guide blades are reached, but being expanded or directed, or expanded and directed against the blades of the turbine rotor 4, and that air at increasing velocity and being further expanded in the turbine course 44, expends energy driving the turbine rotor 4 by the impact upon the turbine blades 7, and thereby creates work continuously upon the turbine rotor 4 and through the shaft upon the compressor rotor 3, so that the energy of the compressed air, reaching the turbine course 44, is utilized to create kinetic energy upon the shaft 9 and that energy is utilized for partial supply of the work to drive compressor rotor 3 and to compress the air being supplied to space 40 and thereafter to turbine course 44. In this manner, in both the winter and the summer operation, the work of compressing air is continually returned to shaft 9, to assist in the driving of the shaft 9 and rotor 3, and the balance of work required to drive the compressor rotor 3 and also the crank shaft 27 and its associated compressor pistons 32, 33, is supplied by the electric motor 21.

Any commonly known safety valve means may be used in the refrigerant circuit. Blower 53 will be of such relatively small size that the air is only blown thereby, not compressed, and if desired any speed reducing means between it and shaft 9, may be used to aid in procuring that effect.

While I have shown particular devices and combinations of devices, in illustration of my invention, I contemplate that other detailed devices and combinations of devices may be used in effecting the invention and the result indicated, as my invention.

What I claim is:

1. In a means for changing the temperature of the interior of a building or other enclosed space; a primary air course including compressing space having a compressing means associated therewith, a compressed air course having induction from said compressing space and within confining walls, a primary air discharge conduit discharging from said compressed air course and an air expansion operated motor means operating in the primary air discharge conduit; a secondary air course including an air blowing channel and air blower means operating therein, a secondary air intake to said air blowing channel, and a secondary air discharge from said air blowing channel; conductive means including atmospheric air inspirating and atmospheric air aspirating means, another conductive means including internal intake means in said enclosed space and internal discharge means in said enclosed space; valve means for alternatively including one of said conductive means with said primary means to procure passage of atmospheric external air through said primary air course and the other of said conductive means with said secondary air course to procure passage of internal air from said enclosed space through said secondary air course in one condition of operation, and to procure in the alternative condition inclusion of the second one of said conductive means with said primary means to procure passage of internal air from said enclosed space through said primary air course, and inclusion of the first one of said conductive means with said secondary air course to procure passage of atmospheric external air through said primary air course; a heat carrier fluid circuit including a heat absorption conduit within heat conductive walls exposed to air passing in said compressed air course, a heat transfer conduit within heat conductive walls exposed to air in said secondary air course, a carrier fluid compressor receiving carrier fluid from said heat absorption conduit and discharging carrier fluid under compression to said heat transfer conduit, an expansion valve conduit means for compression retention and conducting carrier fluid from said heat transfer conduit to said heat absorption conduit; and motor means for driving said first named compressing means and said second named carried fluid compressor, and a driving connection between the air expansion operated motor means and the first named compressing means.

2. All of the means described and claimed in claim 1, and in combination therewith; thermostatic control means susceptible to temperature change in said enclosed space, power current supply means, the said thermostatic control means having means to effect driving of said motor means by said power current supply means in one of said alternative conditions when temperature in said enclosed space is under a predetermined control temperature and to effect driving of said motor means by said power current supply means in the other of said alternative conditions when temperature in said enclosed space is over a predetermined control temperature.

3. In a means for changing the temperature of the interior of a building or other enclosed space, a compressing air course and compressing means associated therewith to compress air passing through the compressing air course, a heat absorption course connected with the compressing air course in sequence, and an air expansion course in conductive sequence with said heat absorption course and an air expansion operated motor means in said air expansion course to convert energy of air passing therethrough to kinetic energy; a heat transfer course and an air displacement means associated therewith to move air therethrough; an air conductive means to pass air from atmosphere externally of said enclosed space to said compressing air course and from said air expansion course back to atmosphere externally of said enclosed space; internal air conductive means to pass air from enclosed space to said heat transfer course and from said heat transfer course back to said enclosed space; a heat carrier fluid course including a heat absorption conduit within heat conductive walls exposed to air in said heat absorption course and including a carrier fluid compressing course in conductive sequence with said heat absorption conduit and compressing means for compressing the carrier fluid in said carrier fluid compressing course, and including a heat transfer conduit within heat conductive walls exposed to air passing in said heat transfer course and in conductive sequence with said carrier fluid compressing course, and means passing carrier fluid from said heat transfer conduit back to said heat absorption conduit, and compression maintaining means between the heat transfer conduit and the heat absorption conduit to permit passage of carrier fluid while substantially maintaining pressure in the heat transfer conduit; motor means for operating said first named compressing means and said last named compressing means, and an operating connection between said air expansion operated motor means and said compressing means to impose kinetic energy produced by said air expansion operated motor means upon said compressing means; valve means for procuring alternative conditions of operation; in one of said alternative conditions, procuring inclusion of one of said conductive means with said compressing air course and said heat absorption course and said air expansion course to pass external atmospheric air therethrough and procuring at the same time inclusion of the other of said conductive means with said heat transfer course to pass internal air therethrough from said enclosed space; and in the other of said alternative conditions, procuring inclusion of one of said conductive means with said compressing air course and said heat absorption course and said air expansion course to pass internal air from said enclosed space therethrough, and at the same time procuring inclusion of the other of said conductive means with said heat transfer course to pass external atmospheric air therethrough.

4. In a means for changing the temperature of the interior of a building or other enclosed space, a compressing air course and compressing means associated therewith to compress air passing through the compressing air course, a heat absorption course connected with the compressing air course in sequence, and an air expansion course in conductive sequence with said heat absorption course and an air expansion operated motor means in said air expansion course to convert energy of air passing therethrough to kinetic energy; a heat transfer course and an air displacement means associated therethrough to move air therethrough; an air conductive means to pass air from atmosphere externally of said enclosed space to said compressing air course and from said air expansion course back to atmosphere externally of said enclosed space; internal air conductive means to pass air from said enclosed space to said heat transfer course and from said heat transfer course back to said enclosed space; a heat carrier fluid course including a heat absorption conduit within heat conductive walls exposed to air in said heat absorption course and including a carrier fluid compressing course in conductive sequence with said heat absorption conduit and compressing means for compressing the carrier fluid in said carrier fluid compressing course, and including a heat transfer conduit within heat conductive walls exposed to air passing in said heat transfer course and in conductive sequence with said carrier fluid compressing course, and means passing carrier fluid from said heat transfer conduit back to said heat absorption conduit; and compression maintaining means between the heat transfer conduit and the absorption conduit to permit passage of carrier fluid while substantially maintaining pressure in the heat transfer conduit; motor means for operating said first named compressing means and said last named compressing means, and an operating connection between said air expansion operated motor means and said compressing means to impose kinetic energy produced by said air expansion operated motor means upon said compressing means; thermostatic control means and valve means; the said thermostatic control means and valve means procuring alternative conditions of operation; in one of said alternative conditions, procuring inclusion of one of said conductive means with said compressing air course and said heat absorption course and said air expansion course to pass external atmospheric air therethrough and procuring at the same time inclusion of the other of said conductive means with said heat transfer course to pass internal air from said enclosed space through said heat transfer course; and in the other of said alternative conditions, procuring inclusion of one of said conductive means with said compressing air course and said heat absorption course and said air expansion course to pass internal air from said enclosed space through said compressing air course and said heat absorption course and said air expansion course, and procuring at the same time inclusion of the other of said conductive means with said heat transfer course to pass external atmospheric air from exterior atmosphere through said heat transfer course.

5. In a means for changing the temperature of the interior of a building or other enclosed space, a compressing air course and compressing means associated therewith to compress air passing through the compressing air course, a heat absorption course connected with the compressing air course in sequence and an air expansion course in conductive sequence with said heat absorption course; a heat transfer course and an air displacement means associated therewith to move air therethrough; an air expansion operated motor means operating in said air expansion course and a driving connection between the air expansion operated motor means and the compressing means in the compressing air course; an air conductive means to pass air from atmosphere externally of said enclosed space to said compressing air course and from said air expansion course back to atmosphere externally of said enclosed space; internal air conductive means to pass air from said enclosed space to said heat transfer course and from said heat transfer course back to said enclosed space; a heat carrier fluid course including a heat absorption conduit within heat conductive walls exposed to air in said heat absorption course and including a carrier fluid compressing course in conductive sequence with said heat absorption conduit and compressing means for compressing the carrier fluid in said carrier fluid compressing course, and including a heat transfer conduit within heat conductive walls exposed to air passing in said heat transfer course and in conductive sequence with said carrier fluid compressing course, and means including expansion valve means to pass carrier fluid from said heat transfer conduit back to said heat absorption conduit; and motor means for operating said first named compressing means and said last named compressing means and said air displacement means.

6. All of the means as stated and claimed in claim 5, and in combination therewith; thermostatic control means susceptible to temperature change in said enclosed space, a power current supply means, the said thermostatic control means having means to effect driving of said motor means by said power current supply means when temperature in said enclosed space is under a predetermined minimum temperature.

7. The means stated and claimed in claim 5, and in combination air conductive changing means included in each of said conductive means to procure alternative conditions of operation; one condition in which said conductive means procures passage of external atmospheric air through said compressing air course, heat absorption course and air expansion course with at the same time passage of internal air from said enclosed space through said heat transfer course; and another condition in which said conductive means procures passage of internal air from said enclosed space through said compressing air course, heat absorption course and air expansion course, with at the same time, passage of external atmospheric air through said heat transfer course.

8. The means stated and claimed in claim 5, and air conductive changing means comprising a coordinated valve means included in said conductive means to procure alternative conditions of operation; one condition in which said conductive means procures passage of external atmospheric air through said compressing air course, heat absorption course and air expansion course, with at the same time passage of internal air from said enclosed space through said heat transfer course; and another condition of operation in which said conductive means procures passage of air from said enclosed space through said compressing air course, heat absorption course, and air expansion course, with at the same time, passage of external atmospheric air through said heat transfer course.

9. The means stated and claimed in claim 5, and in combination air conductive changing means included in said conductive means, to procure alternative conditions of operation; the said air conductive changing means comprising a pair of valves and a coordinating means by which said valves are actuated in coordinated manner to procure said alternative conditions in alternative positions of said valves.

ADOLPHE C. PETERSON.

References Cited in the file of this patent

UNITED STATES PATENTS

| Number | Name | Date |
|---|---|---|
| 250,586 | Selfe | Dec. 6, 1881 |
| 290,600 | Palmer | Dec. 18, 1883 |
| 1,942,295 | Kerr | Jan. 2, 1934 |
| 2,008,407 | Stoever | July 16, 1935 |
| 2,473,496 | Mayer | June 14, 1949 |
| 2,527,845 | Peterson | Oct. 31, 1950 |